United States Patent [19]

Yamakado et al.

[11] Patent Number: 5,056,487

[45] Date of Patent: Oct. 15, 1991

[54] TORQUE CONTROL APPARATUS AND METHOD FOR INTERNAL COMBUSTION ENGINES

[75] Inventors: Makoto Yamakado; Yuzo Kadomukai, both of Ibaraki; Ryoichi Maeda, Fujisawa; Masao Fukushima, Machida; Kei Murakami, Zama, all of Japan

[73] Assignees: Hitachi, Ltd., Tokyo; Nissan Motor Co., Ltd., Yokohama, both of Japan

[21] Appl. No.: 575,644

[22] Filed: Aug. 31, 1990

[30] Foreign Application Priority Data

Sep. 2, 1989 [JP] Japan .................................. 1-227765

[51] Int. Cl.⁵ ...................... F02B 75/06; F02D 29/06; F02D 41/14
[52] U.S. Cl. .................................... 123/436; 123/435; 123/192 B
[58] Field of Search ............... 123/192 R, 192 B, 425, 123/435, 436, 481; 364/431.08

[56] References Cited

U.S. PATENT DOCUMENTS

| | | | |
|---|---|---|---|
| 4,543,934 | 10/1985 | Morita et al. | 123/436 X |
| 4,693,077 | 9/1987 | Skarvan et al. | 123/436 X |
| 4,736,724 | 4/1988 | Hamburg et al. | 123/436 X |
| 4,922,869 | 5/1990 | Kadomukai et al. | 123/192 R |
| 4,928,652 | 5/1990 | Shinya et al. | 123/425 X |
| 4,930,478 | 6/1990 | Plee et al. | 123/435 X |
| 4,977,508 | 12/1990 | Tanaka et al. | 123/436 X |
| 4,979,481 | 12/1990 | Shimomura et al. | 123/481 |
| 4,982,707 | 1/1991 | Maeda et al. | 123/192 B |

FOREIGN PATENT DOCUMENTS

| | | | |
|---|---|---|---|
| 0085443 | 5/1984 | Japan | 123/436 |
| 0196950 | 11/1984 | Japan | 123/436 |
| 0171612 | 8/1986 | Japan . | |

*Primary Examiner*—Willis R. Wolfe
*Attorney, Agent, or Firm*—Antonelli, Terry, Stout & Kraus

[57] ABSTRACT

For example, while the state of combustion of an internal combustion engine is detected from a cylinder pressure at the top dead center of the cylinders, if a decision has been made that the detected combustion state is an irregular combustion state, on the basis of a result of comparison between a torque waveform corresponding to the irregular combustion state and a torque waveform under normal combustion state, this torque control apparatus for internal combustion engines according to this invention puts into operation a torque correcting device, such as a motor-generator, mounted fixedly to the internal combustion engine, thereby making the former torque waveform approach the latter torque waveform. Therefore, even when an irregular combustion occurs in the internal combustion engine, the torque waveform is substantially free from irregularity, so that vibration and an abnormal noise can be prevented.

17 Claims, 14 Drawing Sheets

FIG. IA
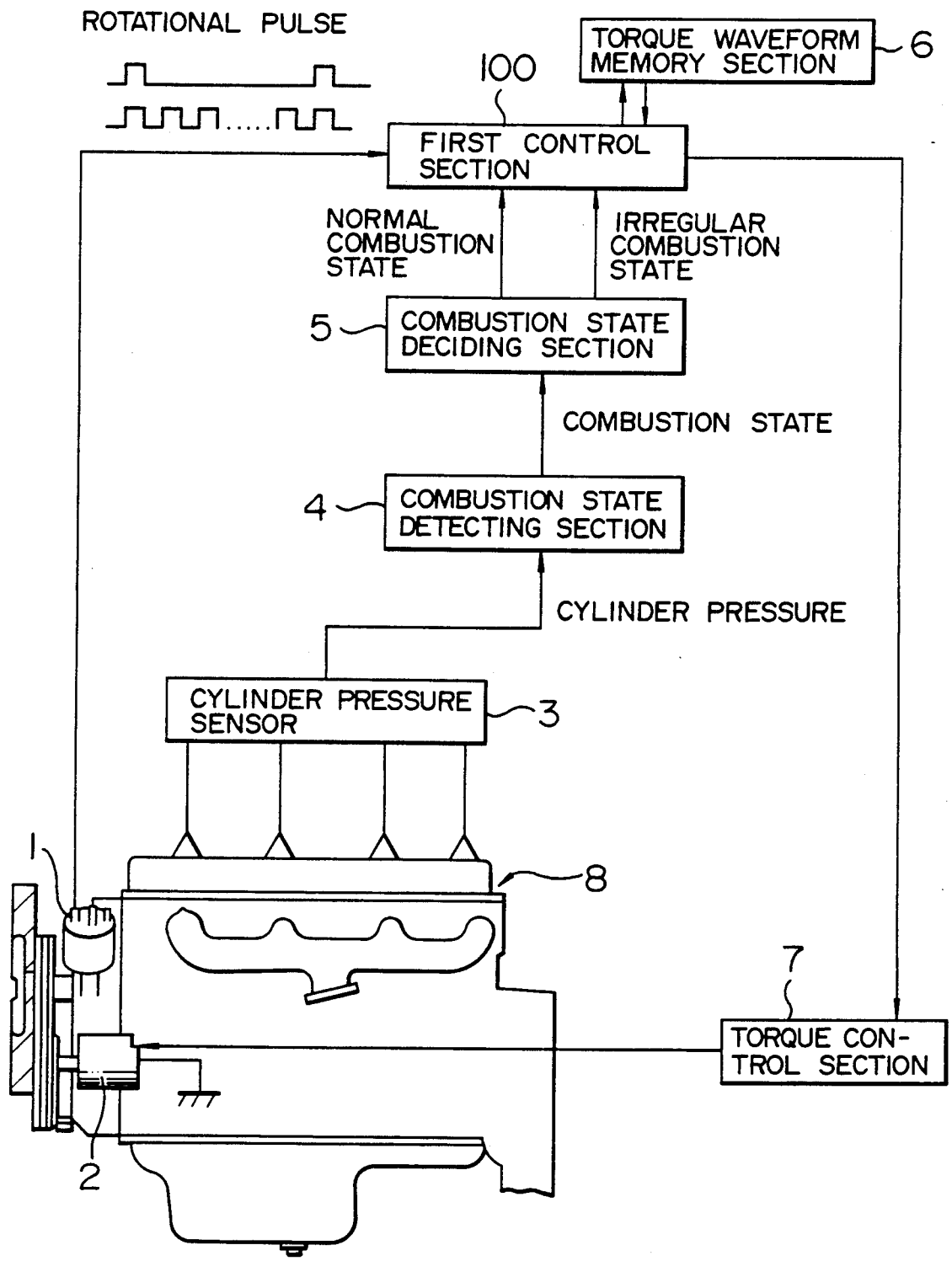

F I G. 9
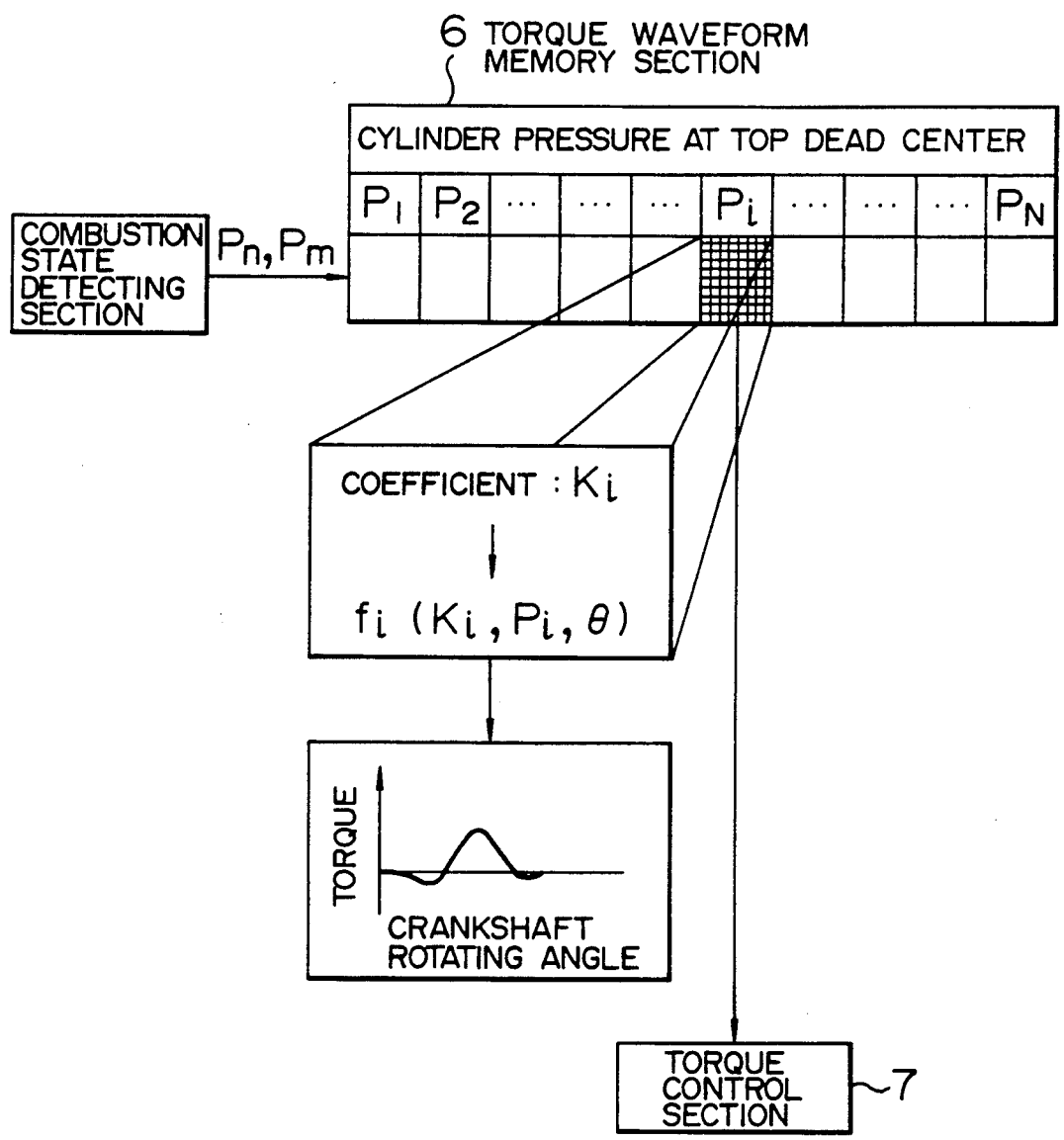

F I G. 14
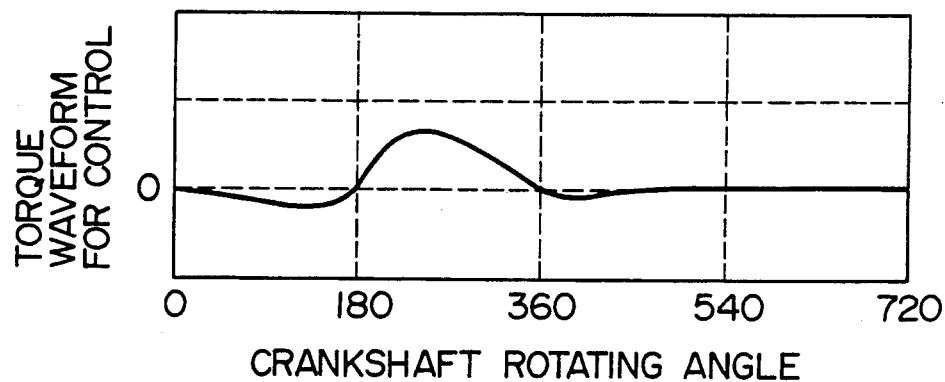
F I G. 15
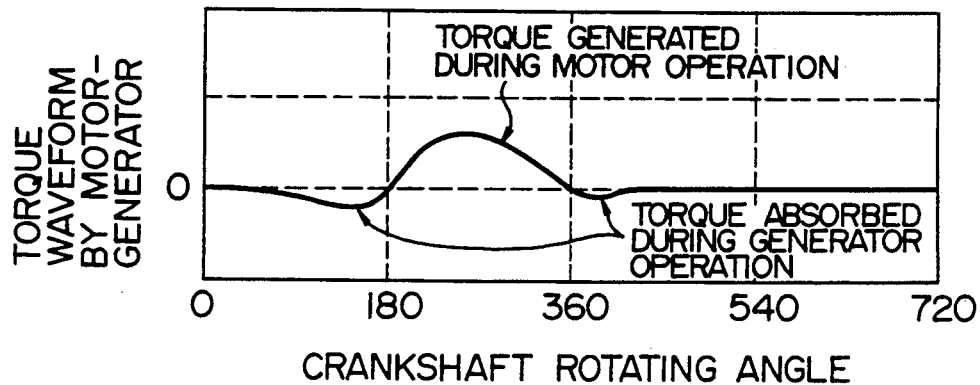
F I G. 16
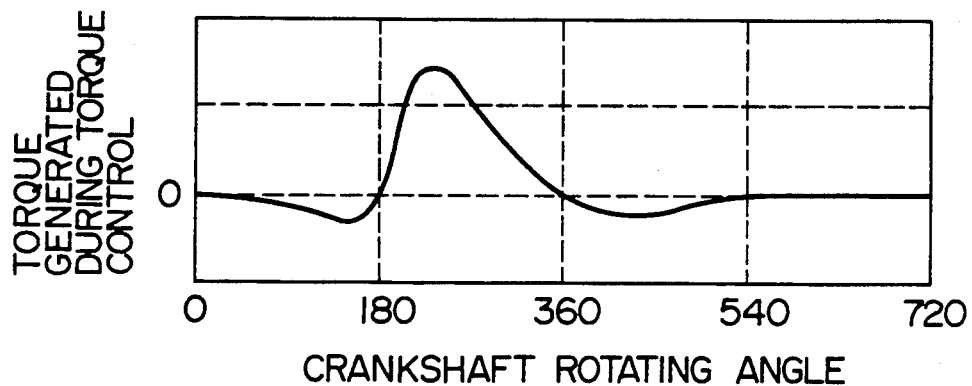

F I G. 17
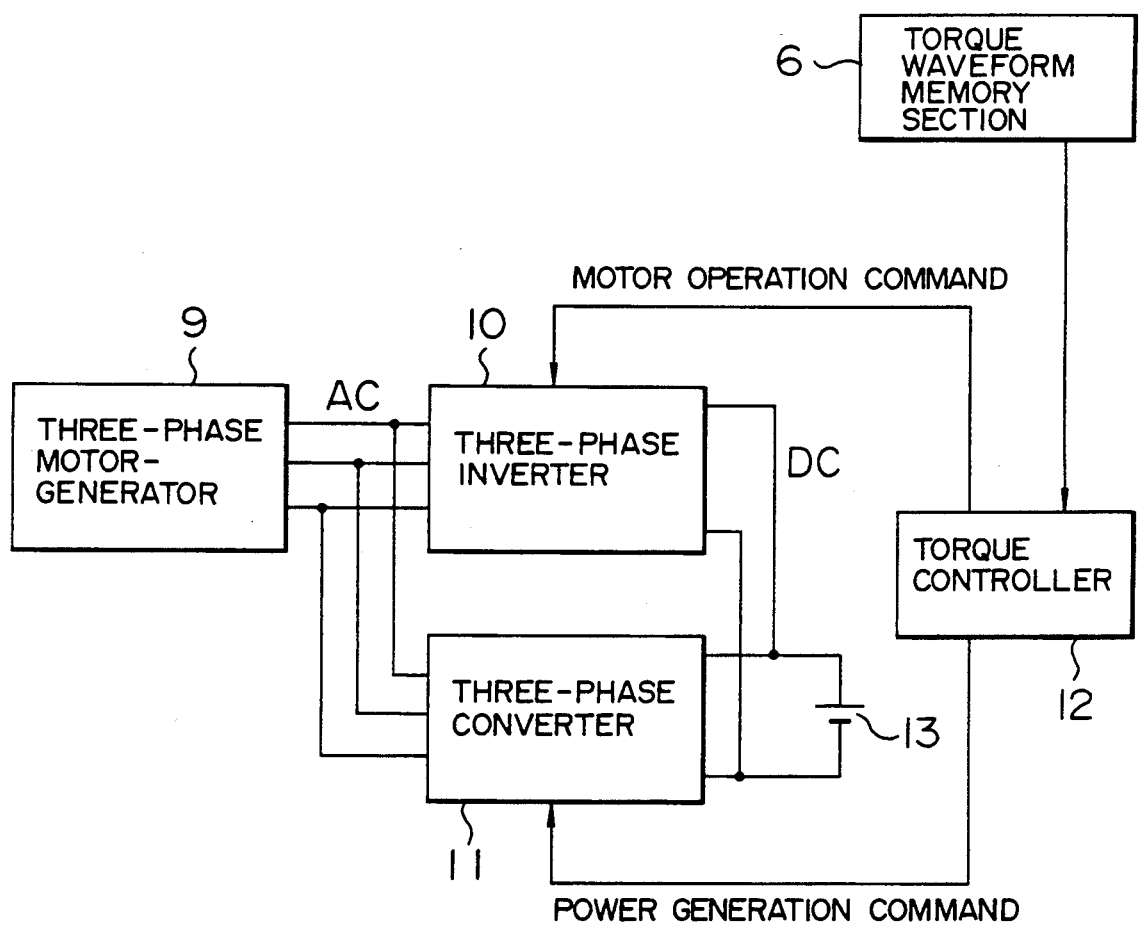

TORQUE CONTROL APPARATUS AND METHOD FOR INTERNAL COMBUSTION ENGINES

BACKGROUND OF THE INVENTION

This invention relates to torque control apparatus and method for internal combustion engines in order to reduce variation in torque waveform, which is caused by an irregular combustion that occurs during an operation of the internal combustion engine.

The variation in torque of the internal combustion engine results in vibration and an abnormal noise of equipment, such as passenger cars, on which it is mounted. Therefore, various countermeasures have been taken with reard to the torque variation.

For example, in JP-A-61-171612, there is proposed an art in which an apparent (gross) torque of a crankshaft is made substantially even by applying a load torque to the crankshaft of an internal combustion engine in which the primary torque varies periodically. In this case, the load torque varies in synchronism with the primary torque variation of the crankshaft. A precondition for this torque unification technique is that the primary torque of the crankshaft varies periodically without fail. If the primary torque is varied irregularly for some reason, there is a possibility that the load torque applied to the crankshaft has such an adverse effect that the apparent torque exceeds the variation range of the primary torque. This phenomenon is not desirable because the vibration and/or abnormal noise mentioned above results.

Irregular combustion is considered as one reason for the irregular torque variation mentioned above. In internal combustion engines of late, the trend has been towards a twin-cam multi-valve engine with a high-speed type cam profile in order to produce high output and high engine speed. For this reason, in the low-speed region, particularly when the engine is in idling state, an irregular combustion tends to occur frequently. A possible cause of irregular combustion is considered to be a mixing of the fuel/air mixture and the exhaust gas when the intake valve and the exhaust valve are open simultaneously (valve overlap). Under this condition, even when the fuel/air mixture is ignited by the igniter, the flame does not propagate through the whole mixture in a cylinder and only local combustion takes place. This causes irregularity of the waveform of the gas torque, resulting in an irregular change in the primary torque of the crankshaft.

SUMMARY OF THE INVENTION

An object of this invention is to reduce the irregularity of the torque waveform, which occurs at an irregular combustion of the internal combustion engine, thereby preventing the occurrence of vibration and an abnormal noise.

In order to achieve this object, a torque control apparatus for internal combustion engines according to this invention.

comprises: means for detecting the state of combustion of an internal combustion engine means for deciding whether or not the state of combustion detected by the detecting means is an irregular combustion; control means for, when a decision is made that the detected state of combustion is an irregular combustion, comparing a torque waveform generated by the internal combustion engine in accordance with the irregular state of combustion, and a torque waveform generated by the internal combustion engine in accordance with a normal state of combustion, and outputting control signals; and torque correcting means, mounted fixedly to the internal combustion engine, for correcting the torque of the internal combustion engine according to a control signal so that the former torque waveform approaches the latter torque waveform.

By a torque control apparatus for internal combustion engines according to this invention, it is possible to instantly and accurately find irregularity in the torque waveform, which occurs at an irregular combustion of the internal combustion engine, by knowing the state of combustion of the internal combustion engine, and in quick response to this detection, the irregularity of the torque waveform caused by the irregular combustion of the internal combustion engine can be reduced instantly and reliably.

BRIEF DESCRIPTION OF THE DRAWINGS

FIGS. 1A and 1B are block diagrams of control circuits as embodiments of this invention;

FIG. 9 is a diagram showing the operation of the torque waveform memory section 6 in which functions representing waveforms are stored;

FIG. 14 is a diagram showing difference between FIGS. 12 and 13;

FIG. 15 is a diagram showing an example of a torque waveform absorbed or generated by motor-generator 2;

FIG. 16 is a diagram showing an example of a waveform of torque generated by the internal combustion engine and the electrical machine when the torque is controlled; and FIG. 17 is a diagram showing another embodiment of this invention in which a three-phase motor-generator is used as an electric machine, and a three-phase inverter and a three-phase converter are used in a torque control section.

DESCRIPTION THE PREFERRED EMBODIMENTS

Figure 1B:
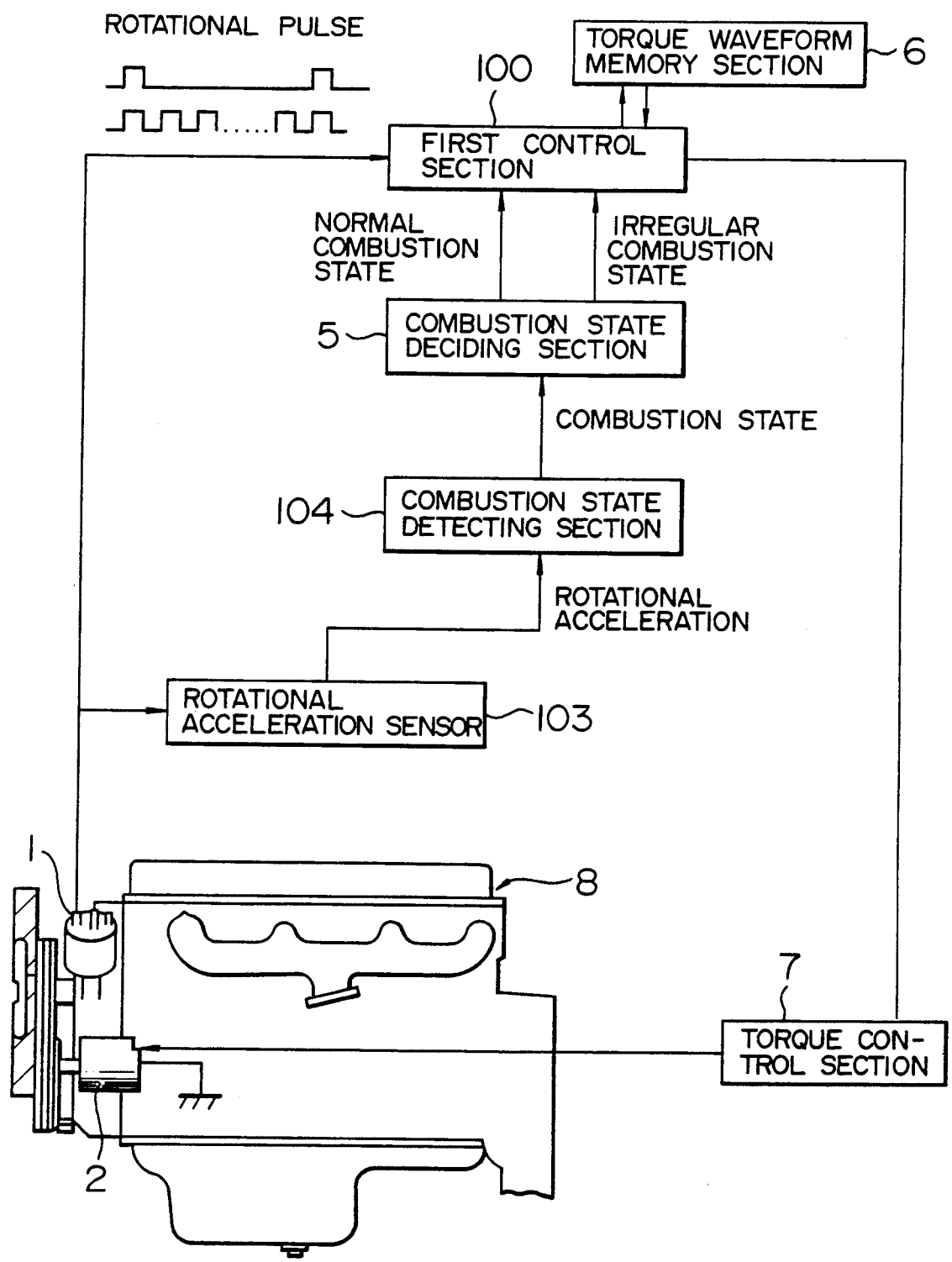

With reference to the accompanying drawings, description will be made of a first embodiment of this invention in which this invention is applied to an internal combustion engine, mounted on a vehicle, for driving the vehicle. FIGS. 1A and 1B are diagrams showing the configuration of control circuits in this embodiment. This torque control apparatus comprises: a crank angle sensor 1 built in a distributor; a motor-generator 2 as an example of a torque correcting device; a cylinder pressure sensor 3 for detecting the cylinder pressure of the internal combustion engine; a combustion state detecting section 4 for detecting the state of combustion of the internal combustion engine from the cylinder pressure output from the cylinder pressure sensor 3; a combustion state deciding section 5 for comparing the newest state of combustion detected by the combustion state detecting section 4 with the mean of the states of normal combustion for the past several revolution, and if a decision is made that the newest combustion state detected by the combustion state detecting section 4 was a normal combustion (if the difference from the mean value of the states of normal combustion is small), updating the mean of the states of normal combustion, and if a decision is made that the newest state of combustion detected by the combustion state detecting section 4 was an irregular combustion (if the difference from the mean value of the states of normal combustion is large), outputting the newest state of combustion detected by the combustion state detecting section and the mean of the states of normal combustion for the past several rotations; a torque waveform memory section 6 for storing the waveform of torque (gas torque) generated by the internal combustion engine in various states of combustion; a first control section 100 for reading, out of the torque waveform memory section 6 according to the newest combustion state of the internal combustion engine detected by the combustion state detecting section 4 mentioned above, a waveform of torque (gas torque) which is generated by the internal combustion engine in that state of combustion and outputting control signals; and torque control section 7 for controlling a torque generated or absorbed by the electric machine 2 according to the control signal.

The combustion state deciding section 5, the first control section 100, the torque control section 7 and the torque waveform memory section 6 are formed by a micro computer system.

The motor-generator 2 is driven by the internal combustion engine main body 8 by the intermediary of a V-belt, and is mounted fixedly to the internal combustion engine main body 8.

The crank angle sensor 1 outputs two kinds of rotational pulses. One is a pulse which is output each time the crankshaft of the internal combustion engine makes one rotation, and the other is a pulse which is output each time the crankshaft of the internal combustion engine rotates by a fixed angle (normally one or two degrees; one degree in this embodiment). Of these two kinds of rotational pulses, if the former is used as signals representing reference angles for the rotating angle of the crankshaft and the latter is used as signals by which to subdivide the intermediate ranges between the reference angles, a rotating angle of the crankshaft at a given moment can be detected accurately (with the minimum division of one degree in this embodiment) and easily.

Figure 2:
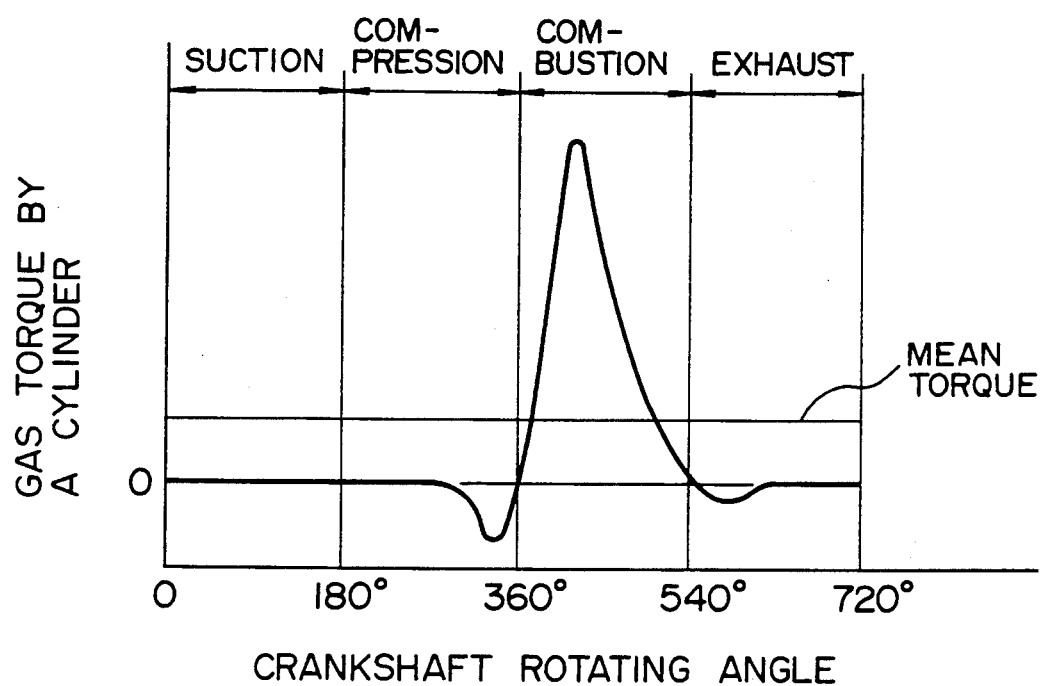
FIGS. 2, 3, and 4 are diagrams showing torque waveforms that occur in an internal combustion engine.

FIG. 2 is a diagram indicating the gas torque that a cylinder of a four-stroke cycle engine generates in normal state of combustion, shown as an example of gas torque of an internal combustion engine. A combustion cycle of a four-stroke cycle engine, that is, four strokes of suction, compression, combustion and exhaust correspond to 720° in terms of rotating angle of the crankshaft. For a four-cylinder engine, a superposition of the torque of FIG. 2 four times with an angular spacing of 720°/4=180° gives a gas torque that the engine generates in one combustion cycle. This gas torque, added with variation in inertial torque due to fluctuation of rotational inertia, is the primary torque that the internal combustion engine actually generates in normal state of combustion (FIG. 3).

Figure 3:
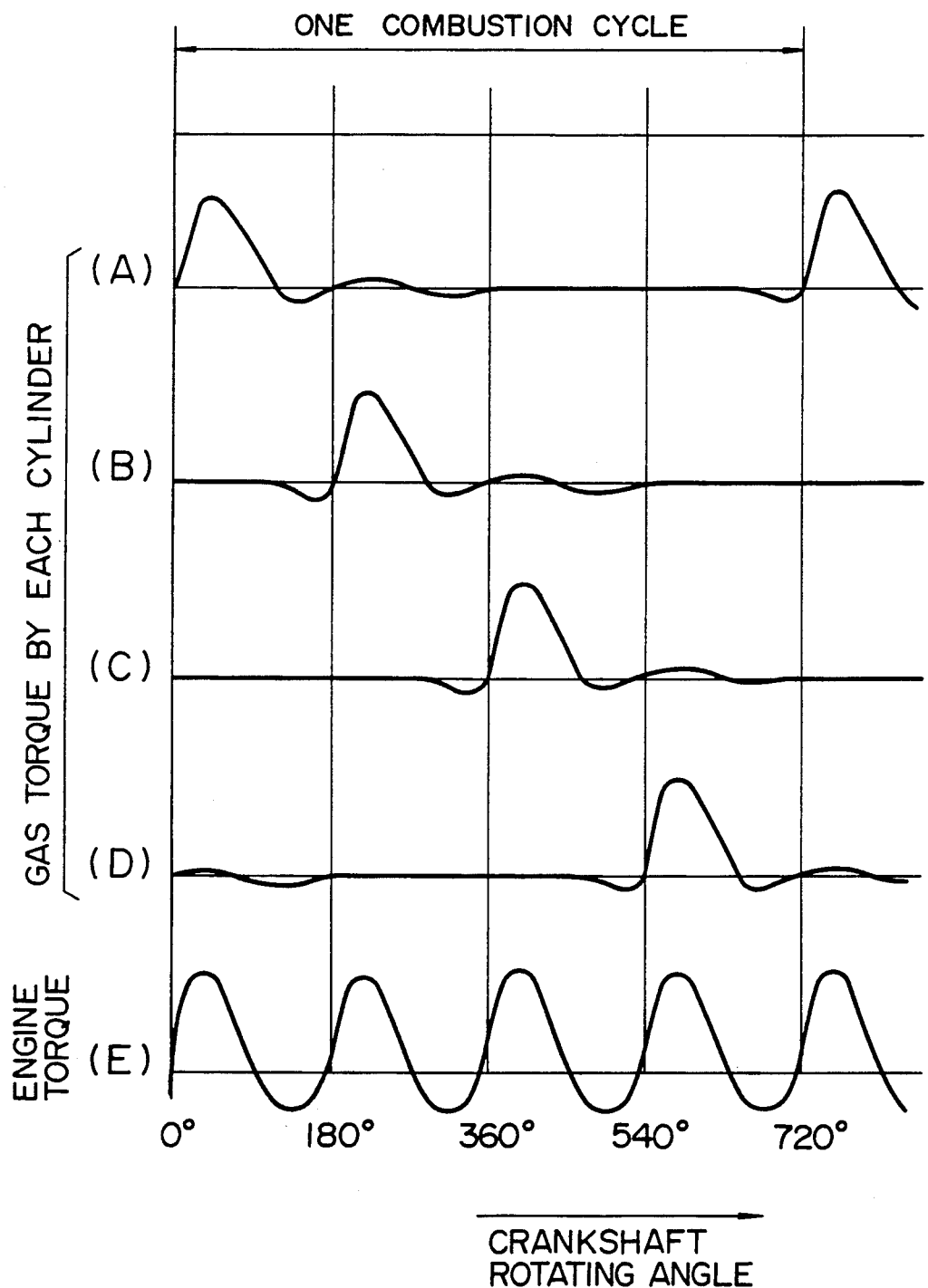
Figure 4:
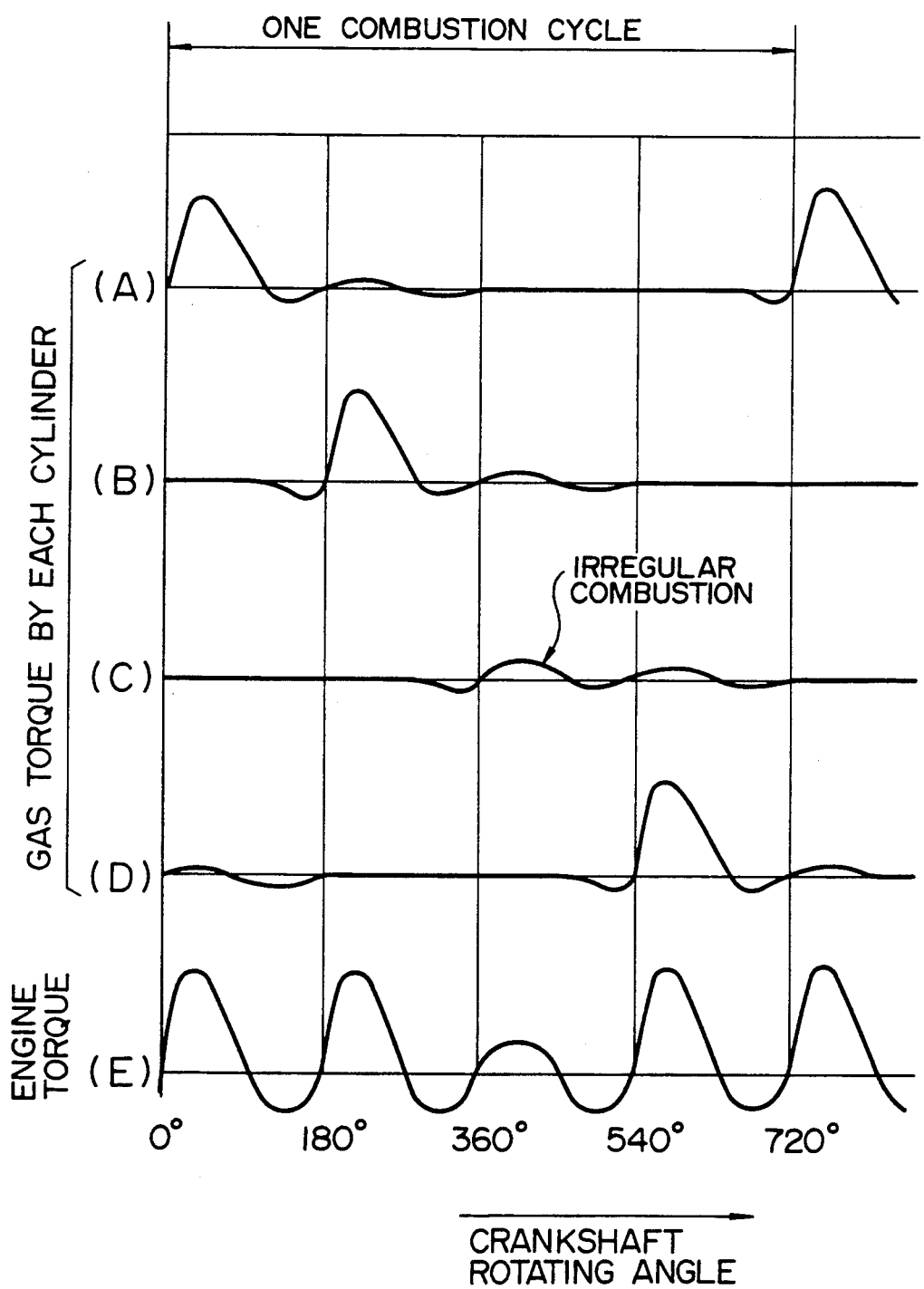

FIG. 4 shows the primary gas torque together with the gas torque generated by each cylinder in a case where the cylinder (C) had an irregular combustion in the same four-stroke cycle four-cylinder internal combustion engine as in FIG. 3. When an irregular combustion occurs, this gives rise to a deficiency in gas torque, causing irregularity in the waveform of the primary torque that the internal combustion engine generates. This invention adjusts the torque of the motor-generator 2 according to the state of combustion of the internal combustion engine, thereby reducing the irregularity in the waveform of the primary torque.

Figure 5:
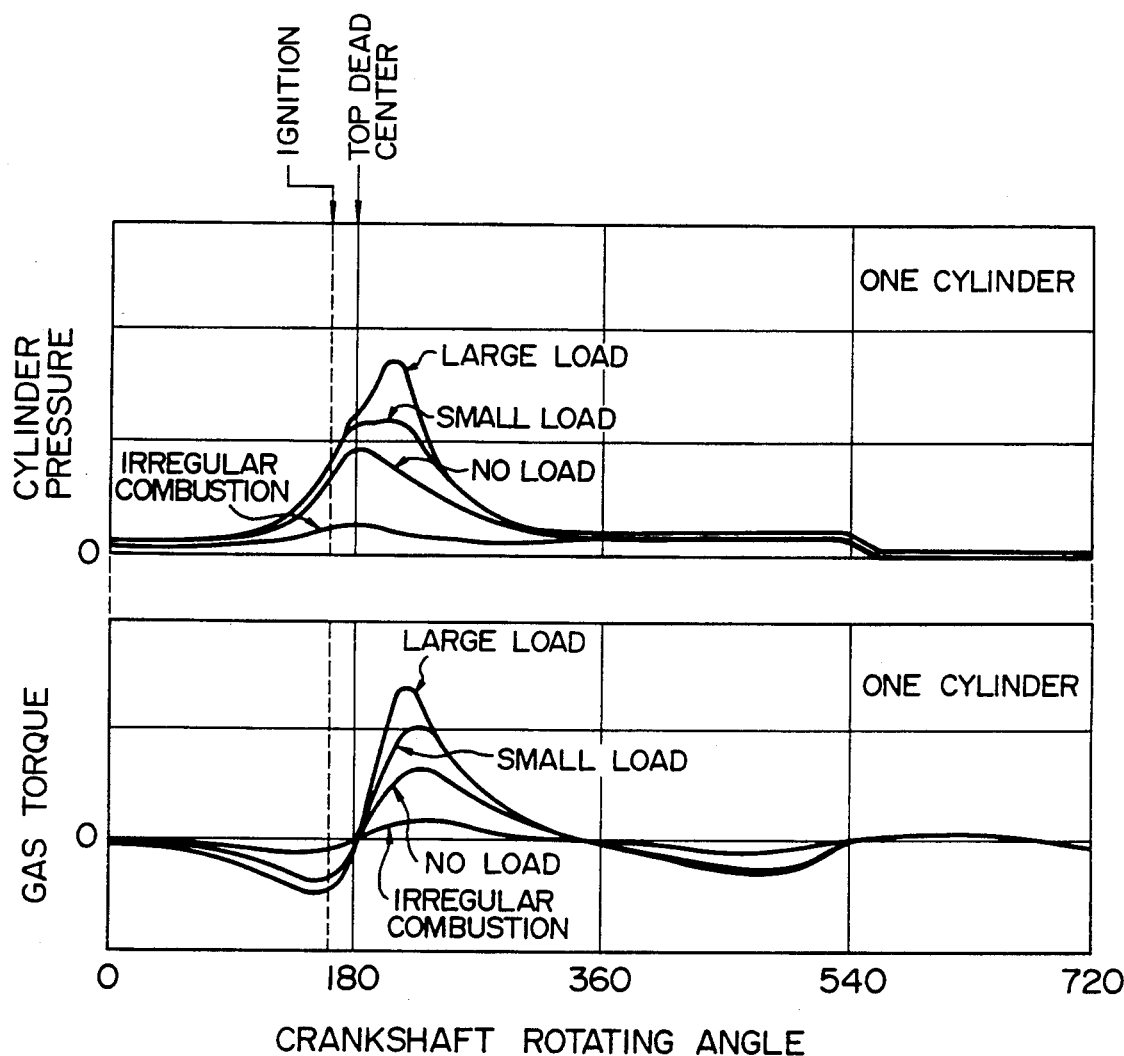
FIG. 5 is a diagram showing an example of changes in cylinder pressure and gas torque in one combustion cycle in a certain cylinder of the internal combustion engine.

FIG. 5 shows an example of changes in cylinder pressure and gas torque in one combustion cycle of certain cylinder of the four-stroke cycle four-cylinder internal combustion engine. In this example, the piston came to the top dead center when the crank angle is at 180°. As shown in FIG. 5, an internal combustion engine has a characteristic that the gas torque is substantially proportional to the cylinder pressure. By using this characteristic, the gas torque can be detected from the cylinder pressure. When an irregular combustion is occurring, both the cylinder pressure and the gas torque are smaller values than in no-load operation. The simplest method of knowing the state of combustion in an internal combustion engine is to know the cylinder pressure when the compression stroke of the internal combustion engine has been completed, that is to say, at the top dead center. Generally, in internal combustion engines having an ignition mechanism, ignition timing is normally controlled so that ignition takes place a little earlier than the finish time of the compression stroke (in the example of FIG. 5, ignition occurred 15° earlier than the top dead center in terms of crank angle). To this end, the cylinder pressure at the point when the compression stroke ends (briefly referred to as the top-dead-center cylinder pressure) is detected for each cylinder, the detected top-dead-center cylinder pressure is compared with the mean of the top-dead-center cylinder pressure of the past several revolutions for each cylinder, and if the difference is large, that cylinder is regarded as suffering from an irregular combustion. In this way, it is possible to decide whether o not the combustion is normal in the current cycle for the respective cylinders. As shown in FIG. 5, the peak value of the gas torque of every cylinder lags behind the top dead center. By using this time lag, after an irregular combustion is detected by the detection of the top-dead-center cylinder pressure, it is possible to correct the irregularity of the gas torque waveform resulting from the irregular combustion. By the method described, the combustion state detecting section 4 in this embodiment detects the state of combustion of the internal combustion engine as the top-dead-center cylinder pressure for each cylinder.

The above-mentioned method is no more than an example of methods of knowing the state of combustion of an internal combustion engine most easily. By adding other quantities of state such as the rotating speed, intake air quantity, cooling water temperature, oil temperature and the gear position of the speed change gear, it is easily achievable to more precisely specify and detect the state of combustion of the internal combustion engine.

Further, it is also possible to detect the state of combustion of the respective cylinders from the acceleration of the rotation of crankshaft of the internal combustion engine. The acceleration of the rotation of the crankshaft follows the torque generated by the internal combustion engine. When a normal combustion is taking place in respective cylinders, the acceleration of the rotation of the crankshaft traces a waveform equivalent to the waveform generated by the engine as shown in FIG. 3 (E) in the same phase. On the other hand, when an irregular combustion occurs, the rotation acceleration of the crankshaft traces a waveform equivalent to the waveform shown in FIG. 4 (E). Therefore, the state of the combustion is decided by detecting the rotation acceleration of the predetermined rotation angle of the crankshaft (e.g. the angle in which the rotation acceleration is a maximum value) corresponding to the respective cylinders.

The top dead center of the rotation acceleration of the crankshaft appears corresponding to the top dead center of the waveform of the gas torque. Therefore, the state of the combustion can be also decided by detecting the change of the rotation acceleration at the top dead center of the rotation acceleration of the crankshaft. For example, if the irregular combustion occurs, the change of the rotation acceleration of the top dead center is smaller than the change of the rotation acceleration as the normal combustion is taking place.

FIG. 1B shows an embodiment in a case where the state of combustion is detected from the rotational acceleration. Those parts of FIG. 1B which are identical with those of FIG. 1A are designated by the same reference numerals. In Fig. 1B, a rotational acceleration sensor 103 detects acceleration from the spacing of pulses sent from the crank angle sensor. The combustion state detecting section 104 detects the state of combustion of the cylinders of the internal combustion engine from the rotational acceleration output from the rotational acceleration sensor 103.

Figure 6:
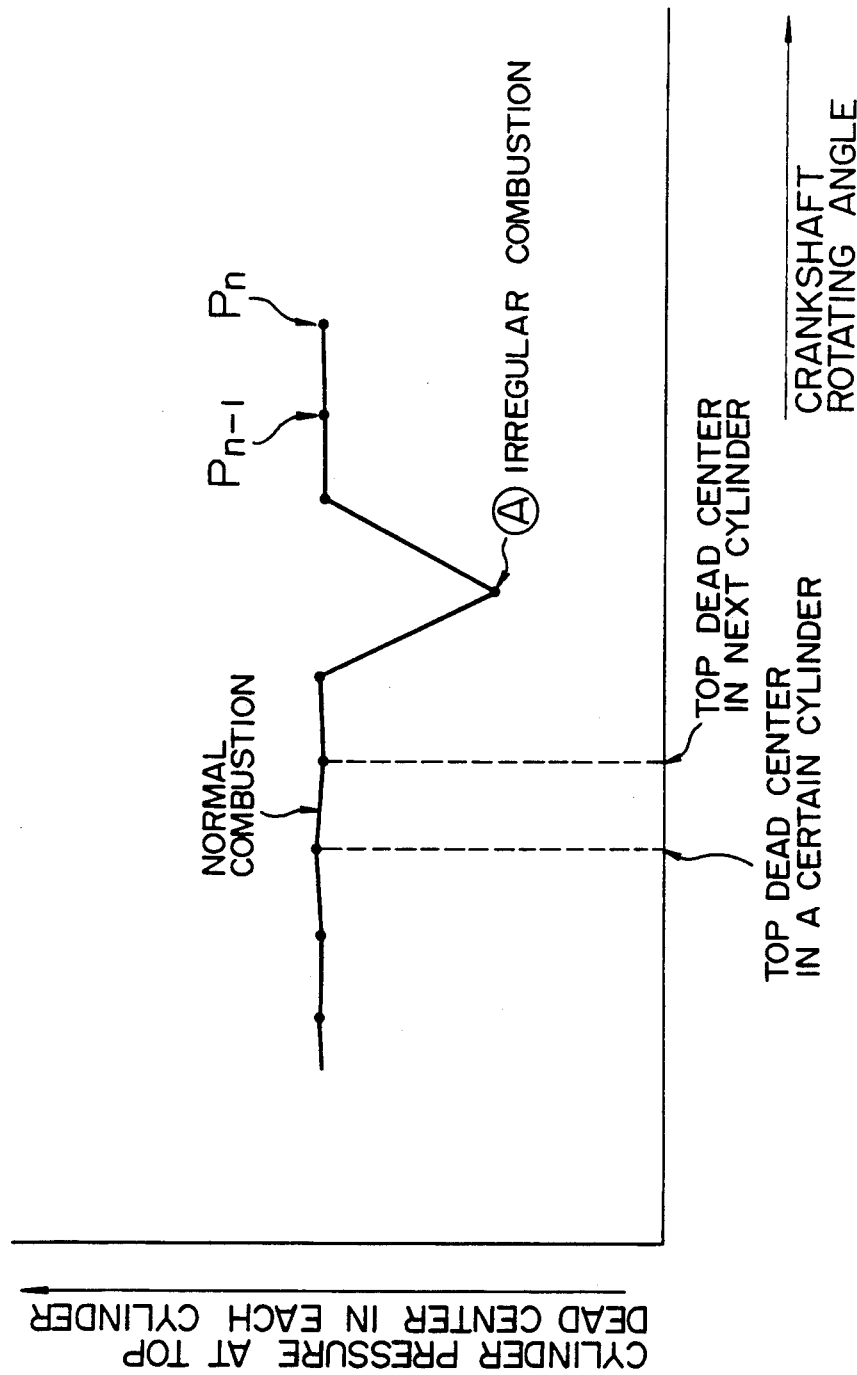
FIG. 6 is a diagram showing detected output of top-dead-center cylinder pressure of the successively firing cylinders.

FIG. 6 shows detection output of the combustion state detecting section 4, which is detected as the top-dead-center cylinder pressure in each cylinder as mentioned above. As the crankshaft rotates, the top-dead-center cylinder pressure of a certain cylinder of a multi-cylinder engine is detected, and then, the top-dead-center cylinder pressure of another cylinder which reaches the top dead center next is detected. In this manner, each time a cylinder reaches the top dead center, the top-dead-center cylinder pressure of that cylinder is detected. As shown in FIG. 6, detected pressure values from the successively firing cylinders are output sequentially from the combustion state detecting section 4 as the crankshaft rotates. In FIG. 6, the point A indicates a detected value from a certain cylinder when an irregular combustion occurs in that cylinder, and this detected value is conspicuously lower than other detected values representing normal combustion states.

Figure 7:
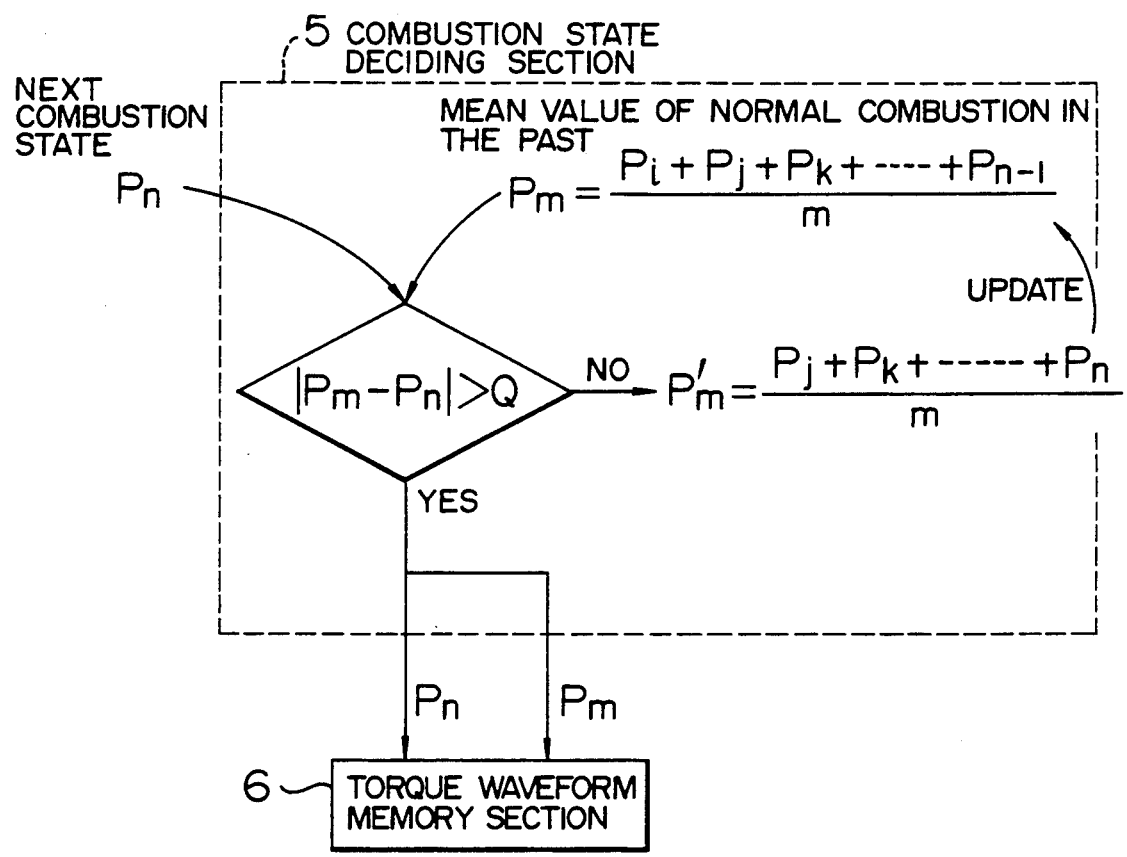
FIG. 7 is a diagram showing the operation of the combustion state deciding section 5.

The operation of the combustion state deciding section 5 in this embodiment will next be described with reference to FIG. 7. The combustion state deciding section 5 compares a detected value $P_n$ of the n-th top-dead-center cylinder pressure newest provided from the combustion state detecting section 4 with a mean $P_m$ of m pieces of detected values of normal top-dead-center pressure for the past several revolutions. If at this time the relation of $|P_m - P_n| > Q$ holds (Q is a predetermined positive threshold), a decision is made that the state of combustion represented by the above-mentioned detected value $P_n$ of the n-th top-dead-center cylinder pressure is an irregular combustion state. As a result, the combustion state deciding section 5 outputs the detected value $P_n$ of the n-th top-dead-center cylinder pressure and the mean $P_m$ of the detected values of the m normal top-dead-center cylinder pressure in the past to the first control section 100. In addition, if the $P_n$ is a normal combustion state, the combustion state deciding section 5 updates the $P_m$ to a mean $P_m$ including the $P_m$.

Figure 8:
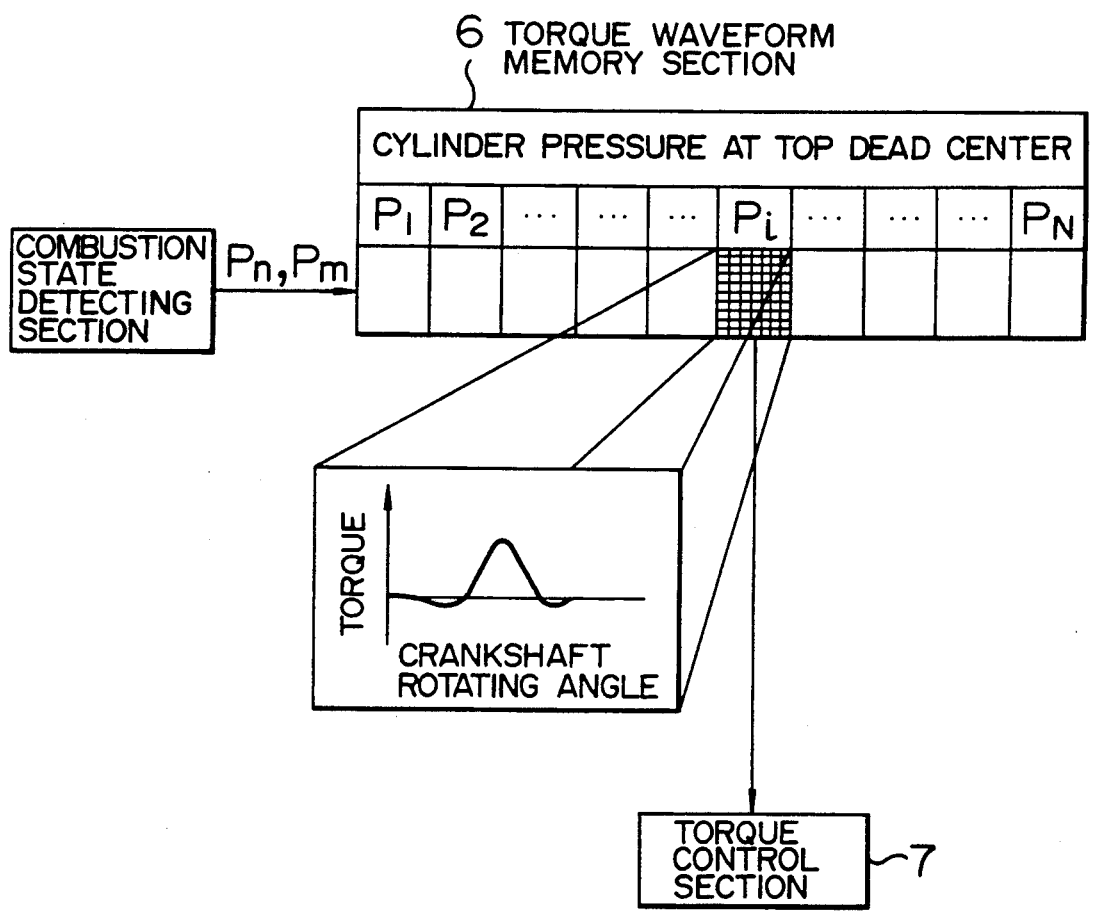
FIG. 8 is a diagram showing the operation of the torque waveform memory section 6 in which torque waveforms are stored.

As shown in FIG. 8, the torque waveform memory section 6 stores waveforms of torque for one combustion cycle, generated by an arbitrary cylinder of an internal combustion engine and shown with divisions of degrees (one degree being the minimum rotating angle of the crankshaft) detectable by the above-mentioned crank angle sensor 1, said waveforms corresponding to various top-dead-center cylinder pressure values. In FIG. 8, $P_i (i = 1, 2, \ldots, N)$ is a representative (e.g., a median) of the i-th division when the variability domain of a value of top-dead-center cylinder pressure for an arbitrary cylinder is divided into N divisions. The waveforms of the torque (gas torque) for one combustion cycle of an arbitrary cylinder in the states of combustion corresponding to each $P_i$ are stored in the torque waveform memory section 6 as illustrated in FIG. 8.

With regard to detected values of top-dead-center cylinder pressure of the successively firing cylinders, detected by the combustion state detecting section 4, when the combustion state deciding section 5 has decided that the newest detected value $P_n$ indicates an irregular combustion state, in the first control section 100, the above-mentioned division representative $P_i$ corresponding to the newest detected value $P_n$ and a division representative Pj corresponding to the mean $P_m$ of m detected values of top-dead-center cylinder pressure for the past several revolutions are selected, and out of the above-mentioned torque waveforms stored in the torque waveform memory section 6, and a gas torque waveform in an irregular combustion state represented by the value $P_i$ and a gas torque waveform in a normal combustion state represented by the value Pj selected as described are output to the torque control section 7. The gas torque waveforms are output synchronized with the rotational pulses sent at a rate of one pulse at every degree of revolution from the crank angle sensor 1. Therefore, it is possible to output gas torque waveforms generated according to the rotating angle of the crankshaft, which are reproduced with high fidelity.

The torque waveform memory section 6 in this embodiment stores torque waveforms generated by the cylinders of the internal combustion engine with divisions of degrees, one degree being the minimum rotating angle of the crankshaft detectable by the crank angle sensor. However, if this level of resolution is not required for the rotating angles of the crankshaft, it is possible to use a larger spacing of the rotating angles of the crankshaft in the representation of stored torque waveforms. In addition, in outputting a torque waveform, it is also possible to carry out frequency division of the rotational pulses transmitted at every degree of revolution from the crank angle sensor 1 until the pulses comply with the spacing of the rotating angles in the stored torque waveform, and use the rotational pulses as synchronizing signals in outputting a stored torque waveform.

In the above description, the torque waveform memory section 6 stores gas torque waveforms generated by an arbitrary cylinder of an internal combustion engine with divisions of degrees, one degree being the minimum rotating angle of the crankshaft detectable by the crank angle sensor 1. If the waveform of cylinder gas torque in the combustion state designated by each division representative $P_i$ of the top-dead-center cylinder pressure can be expressed by a function $f_i(K_i, P_i, \theta)$ of a top-dead-center cylinder pressure $P_n$, a rotating angle $\theta$ of the crankshaft, and a coefficient $K_i$, the torque waveform memory section 6 need not store gas torque waveforms that a cylinder of the internal combustion engine generates with divisions of degrees, each degree being the minimum rotating angle of the crankshaft detectable by the crank angle sensor 1, but has only to store a formula expressing the function $f_i$ and an coefficient $K_i$ which is used with the top-dead-center cylinder pressure $P_i$ and the crankshaft rotating angle $\theta$. If, by using these coefficients, a gas torque waveform $f_i(K_i, P_i, \theta)$ is obtained for every rotating angle of the crankshaft (FIG. 9) by the first control section 100 and this gas torque waveform is output synchronized with the rotational pulses sent from the crank angle sensor 1 at a rate of one pulse for each degree of revolution, the gas torque waveform that the cylinders of the internal combustion engine generates at every rotating angle of the crankshaft can be output to the torque control section 7 in the shape reproduced with high fidelity just as in the method shown in FIG. 8.

The difference between the methods of FIGS. 8 and 9 is as follows. In the case of the method of FIG. 8, all gas torque waveforms are stored, so that the torque waveform memory section 6 needs a large memory capacity. In the case of the method of FIG. 9, only coefficients are stored in the memory section 6 in order to produce gas torque waveforms, but on the other hand, in order to compute torque waveforms by using these coefficients, the first control section 100 needs to perform more arithmetic operations. Therefore, which of the methods of FIGS. 8 and 9 to use may be decided by considering the relation between the computing capacity of the first control section 100 and the memory capacity of the torque waveform memory section 6.

Figure 10:
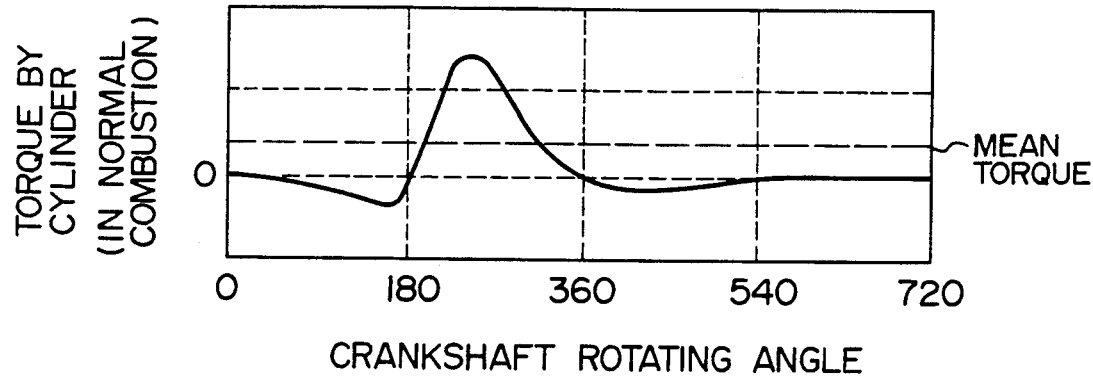
FIG. 10 is a diagram showing an example of a gas torque waveform produced by a cylinder having normal combustion in the internal combustion engine.
Figure 11:
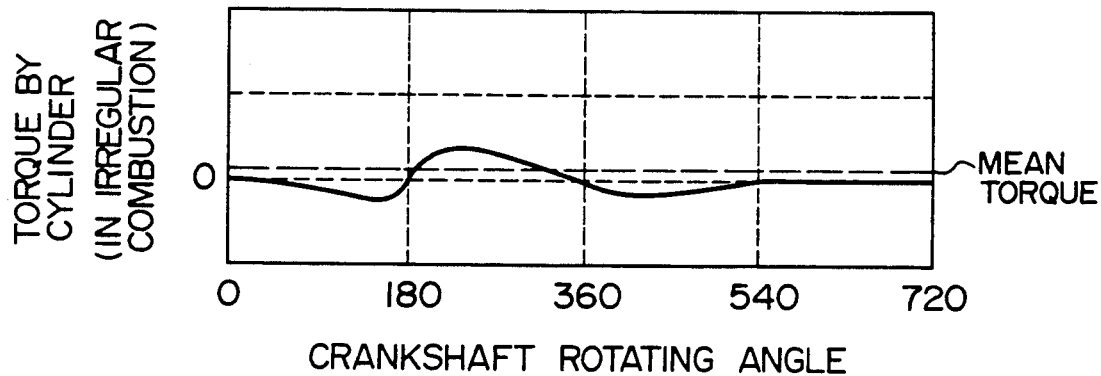
FIG. 11 is a diagram showing an example of a torque waveform produced by a cylinder having an irregular combustion in the internal combustion engine.
Figure 12:
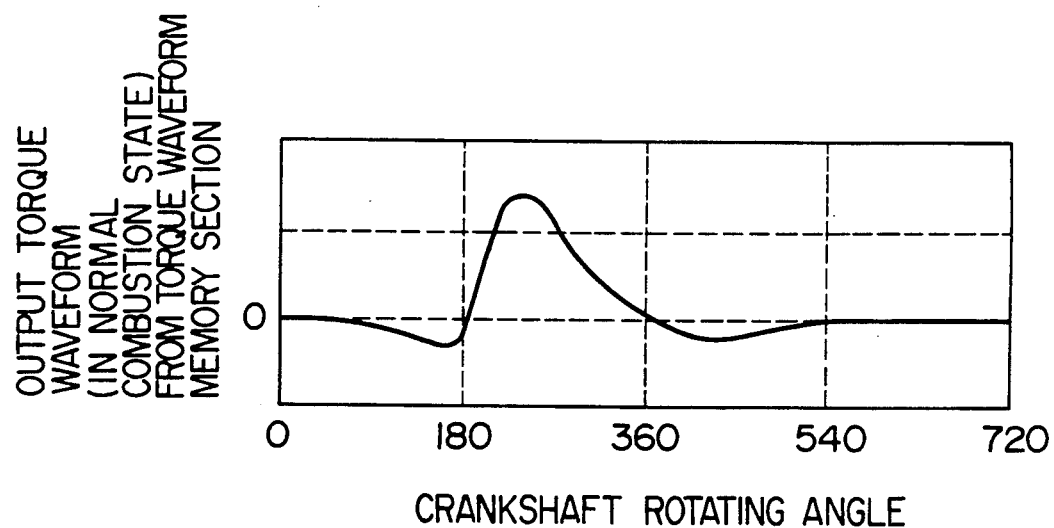
FIG. 12 is a diagram showing an example of a torque waveform output from first control section 100 when a cylinder of the internal combustion engine is generating the torque shown in FIG. 10.
Figure 13:
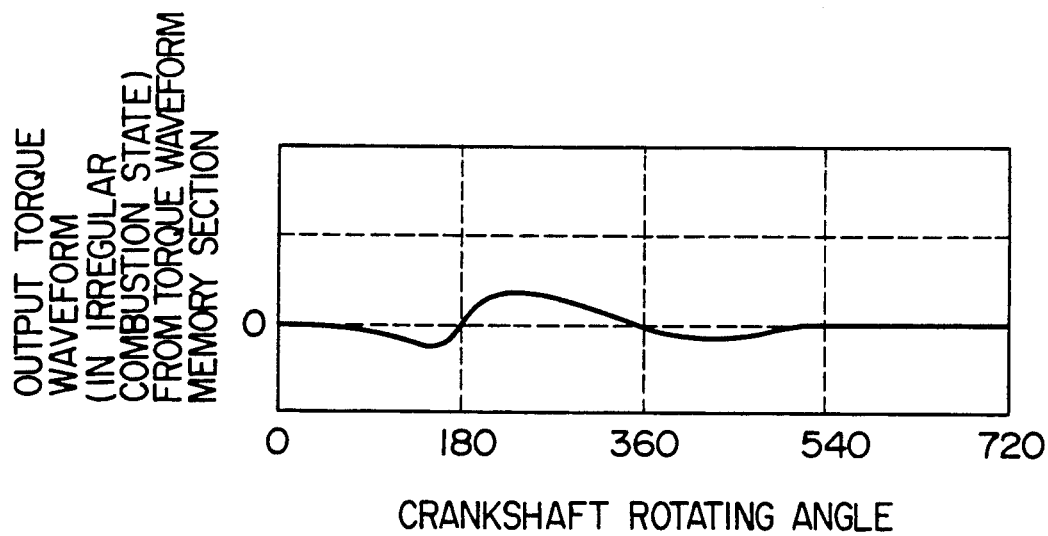
FIG. 13 is a diagram showing an example of a torque waveform output by the torque waveform memory section 6 when a cylinder of the internal combustion engine is generating the torque shown in FIG. 11.

FIG. 10 is a diagram showing an example of a gas torque waveform generated by a certain cylinder in which normal combustion is taking place. FIG. 11 is a diagram showing an example of a gas torque waveform generated by a certain cylinder in which an irregular combustion is occurring. FIG. 12 is a diagram showing an example of a torque waveform that the torque waveform memory section 6 outputs to the first control section 100 when a certain cylinder is generating the gas torque show in FIG. 10 FIG. 13 is a diagram showing an example of a gas torque waveform that the torque waveform memory section 6 outputs to the first control section 100 when a certain cylinder is generating the gas torque shown in FIG. 11. FIG. 14 is a diagram showing a difference between the waveforms of FIGS. 12 and 13. This waveform is made in the first control section 100, and the first control section 100 performs torque control described below according to this torque waveform.

The first control section 100 computs the torque waveform (FIG. 14), which is a difference between the gas torque waveform (FIG. 12) by a cylinder under normal combustion state and the gas torque waveform (FIG. 13) by a cylinder under irregular combustion state, both read out of the torque waveform memory section 6 and outputs control signals to the torque control section 7 corresponding to the torque waveform shown in FIG. 14. The torque control section 7 operates the motor-generator 2 according to the control signals such as a motor when the torque waveform obtained as the difference mentioned above is positive, and operates the motor-generator 2 as a generator when the torque waveform obtained as the difference mentioned above is negative.

FIG. 15 is a diagram showing a torque waveform absorbed or generated by the motor-generator 2 operated as described. Under the torque control as described, a torque waveform is formed jointly by the internal combustion engine and the motor-generator, which torque waveform, shown in FIG. 16, is a combination of the torque waveforms of FIGS. 11 and 15. This torque waveform is identical with the torque waveform free of an irregular combustion (FIG. 10). It ought to be noted that when the cylinder pressure is made greater by an irregular combustion than the cylinder pressure under normal combustion, the torque waveform, which is to be shown in FIG. 15, has a sunken portion.

By performing torque control as described, it is possible to easily and accurately remove the irregularity in the gas torque waveform, caused by an irregular combustion of the internal combustion engine.

Among the fluctuation components of the gas torque generated by an internal combustion engine, if the periodic fluctuation component of the frequency synchronized with the combustion stroke of the internal combustion engine is dominant, substantially the same effect as in torque control described above can be obtained by approximating the shapes of the peaks and troughs of torque waveforms stored in the torque waveform memory section 6 by a sine waveform or a square wave of a frequency synchronized with the combustion stroke of the internal combustion engine. The combustion stroke of an internal combustion engine occurs by the same number as the cylinders of the internal combustion engine in one combustion cycle of the internal combustion engine (720° in a four-stroke cycle internal combustion engine and 360° in a two-stroke cycle internal combustion engine in terms of the rotating angle of the crankshaft). Therefore, the above-mentioned sine wave or square wave of a frequency synchronized with the combustion stroke of the internal combustion engine can be concretely said to be a sine wave or square wave, one period of which wave is a value obtained by dividing one combustion cycle of the internal combustion engine by the number of cylinders (i.e., the rotating angle of the crankshaft).

FIG. 17 shows a second embodiment of this invention in which a three-phase motor-generator 9 is used as a torque correcting device and a three-phase inverter 10 and a three-phase converter 11 are used in the torque control section. The three-phase inverter 10 and the three-phase converter 11 are connected in parallel with each other to the three-phase motor-generator 9 through power lines. The DC sides of the three-phase inverter 10 and the three-phase converter 11 are connected in parallel with each other across a battery 13. A torque controller 12 operates according to the torque waveform of the difference between the torque waveforms under normal and irregular combustion states, read out of the torque waveform memory section 6. When this torque waveform is positive, the torque controller 12 issues a motor operation command to the three-phase inverter 10 to cause the three-phase motor-generator 9 to operate as a three-phase motor by using electric energy of the battery 13, and conversely when the above-mentioned torque waveform is negative, issues a power generation command to the three-phase converter 11 to cause the three-phase motor-generator 9 to work as a three-phase generator (the electric energy produced at this time is stored in the battery 13). In this second embodiment, a three-phase motor-generator, a three-phase inverter and a three-phase converter are used, but needless to say, this invention can be used in applications in which they are single-phase or polyphase devices.

In the first and second embodiments of this invention, description has been made of a case where a motor-generator is used as an electric machine capable of both generation and absorption of torque. Incidentally, to impart torque to an internal combustion engine is equivalent to decrease the load torque of the internal combustion engine which is imparted to the engine before torque control of this invention performs, and to absorb the torque is nothing other than to decrease the torque imparted to the internal combustion engine beforehand. Therefore, it is of course possible to perform torque control of this invention by use of a motor, a generator or a joint use of a motor and a generator.

According to this invention, while the combustion state of the successively firing cylinders of an internal combustion engine is being detected, when a decision is made that the detected state of combustion is an irregular combustion state, on the basis of a comparison result of two torque waveforms, that is, a torque waveform due to the irregular combustion and a torque waveform of normal combustion, a torque correcting device mounted fixedly to the internal combustion engine performs control over the magnitude of the torque absorbed from or imparted to the internal combustion engine, or of both torques imparted to and absorbed from the internal combustion engine. Therefore, it is possible to instantly and reliably reduce the irregularity in the torque waveform generated when an irregular combustion occurs in the internal combustion engine.

We claim:

1. A torque control apparatus for internal combustion engines, comprising:
    means for detecting the state of combustion of an internal combustion engine,
    means for deciding whether or not the state of combustion detected by said detecting means is an irregular combustion;
    control means for, when a decision is made that the detected state of combustion is irregular combustion, comparing a torque waveform generated by the internal combustion engine in accordance with the irregular combustion state, and a torque waveform generated by the internal combustion engine, which corresponds to a normal combustion state, and outputting control signals; and
    torque correcting means, mounted fixedly to the internal combustion engine, for correcting the torque of the internal combustion engine according to a control signal so that said former torque waveform approaches said latter torque waveform.

2. A torque control apparatus according to claim 1, wherein said detecting means detect the combustion state from an internal pressure of combustion chambers of said internal combustion engine.

3. A torque control apparatus according to claim 2, wherein said internal pressure is a cylinder pressure at a top dead center of each cylinder of the internal combustion engine.

4. A torque control apparatus according to claim 1, wherein said detecting means detect the combustion state from the rotational acceleration of the rotating shaft of said internal combustion engine.

5. A torque control apparatus according to claim 1, wherein decision on irregular combustion by said deciding means is made by finding a deviation of data representing a state of combustion as an object of decision from the mean value of past data representing a normal combustion state for a predetermined number of revolutions.

6. A torque control apparatus according to claim 5, wherein when data representing a state of combustion as an object of decision is normal, the oldest data of data used for determining said mean value is replaced by data representing the newest normal combustion state.

7. A torque control apparatus according to claim 1, wherein there is further provided memory means for having previously stored therein torque waveforms that the internal combustion engine generates under various states of combustion, and wherein said control means, when said deciding means decides that the newest combustion state of the internal combustion engine detected by said detecting means is an irregular combustion state, reads out of said memory means a torque waveform corresponding to the newest combustion state of the internal combustion engine detected by said detecting means, also reads out of said memory means a torque waveform corresponding to a normal combustion state, compares said two torque waveforms, and controls said torque corresponding means so that the former torque waveform approaches the latter torque waveform.

8. A torque control apparatus according to claim 7, wherein the torque waveforms previously stored in said memory means are those which are approximated by a part of or all of a sine wave or a square wave, one period of which wave is a value obtained by dividing one combustion cycle of the internal combustion engine (720° in a fourstroke cycle internal combustion engine or 360° in a two-stroke cycle internal combustion engine in terms of the rotating angle of the crankshaft) by a number of cylinders of the internal combustion engine.

9. A torque control apparatus according to claim 7, wherein said control means, when said deciding means decides that the newest combustion state of the internal combustion engine detected by s id detecting means is an irregular combustion state, reads out of said memory means a torque waveform corresponding to the newest combustion state of the internal combustion engine detected; by said detecting means, also reads out of said memory means a torque waveform corresponding to a normal combustion state, compares said two torque waveforms, and controls torque correcting means so that the former torque waveform approaches the latter torque waveform.

10. A torque control apparatus according to claim 9, wherein said memory means has previously stored therein a plurality of torque waveforms corresponding to a plurality of values of cylinder pressure at the top dead center of each cylinder of the internal combustion engine.

11. A torque control apparatus according to claim 1, wherein said control means, when said deciding means decides that the newest combustion state of the internal combustion engine detected by said detecting means is an irregular combustion state, obtains a torque waveform corresponding to the newest combustion state of the internal combustion engine detected by said detecting means, also obtains a torque waveform corresponding to a normal combustion state, compares said two torque waveforms, and controls said torque correcting means so that the former torque waveform approaches the latter torque waveform.

12. A torque control apparatus according to claim 11, further comprising memory means having stored therein functions necessary for computation by said computing means.

13. A torque control apparatus according to claim 12, wherein a function previously stored in said memory means is obtained by approximation by a part of or all of a sine wave or a square wave, one period of which wave is a value obtained by dividing one combustion cycle of the internal combustion engine (720° in a four-stroke cycle internal combustion engine and 360° in a two-stroke cycle internal combustion engine in terms of the rotating angle of the crankshaft) by number of cylinders of the internal combustion engine.

14. A torque control apparatus for internal combustion engines, comprising:
 means for detecting a state of combustion of said internal combustion engine;
 means for deciding whether or not the state of combustion detected by said detecting means is an irregular combustion state;
 control means for, when said deciding means decides that the detected combustion state is an irregular combustion state, comparing a torque waveform generated by the internal combustion engine in accordance with to the irregular combustion state, and a torque waveform generated by the internal combustion engine in accordance with a normal combustion state, and outputting control signals; and
 torque correcting means, mounted fixedly to the internal combustion engine, for adjusting a magnitude of torque imparted to the internal combustion engine and/or a magnitude of torque absorbed from the internal combustion engine according to said control signal, and correcting the torque of the internal combustion engine so that the torque waveform under the irregular combustion state approaches the torque waveform under normal combustion state.

15. A torque control apparatus according to claim 1, wherein said torque correcting means is an electric machine.

16. A torque control apparatus according to claim 15, wherein said electric machine is a three-phase motor-generator which is connected to a direct current power source through a three-phase inverter and a three-phase converter.

17. A torque control method for internal combustion engines, comprising the steps of:
 detecting a state of combustion of said internal combustion engine;
 deciding whether or not the combustion state detected by said detecting step is an irregular combustion state;
 comparing a torque waveform generated by the internal combustion engine in accordance with to the irregular combustion state and a torque waveform generated by the internal combustion engine in accordance with to a normal combustion state when a decision has been made that the detected combustion state is an irregular combustion state; and
 controlling a controlling means, mounted fixedly to said internal combustion engine, which is capable of correcting the torque of the internal combustion engine so that the torque waveform under the irregular combustion state approaches the torque waveform under normal combustion state.

* * * * *